OLIVER VANORMAN.

Improvement in Truss Brace for Axle Skeins.

No. 121,692.  Patented Dec. 5, 1871.

Witnesses.
J. W. Boss
P. H. Case

Inventor:
Oliver Vanorman.

UNITED STATES PATENT OFFICE.

OLIVER VANORMAN, OF FOND DU LAC, WISCONSIN.

IMPROVEMENT IN TRUSS-BRACES FOR AXLE-SKEINS.

Specification forming part of Letters Patent No. 121,692, dated December 5, 1871.

*To all whom it may concern:*

Be it known that I, OLIVER VANORMAN, of the city of Fond du Lac, county of Fond du Lac and State of Wisconsin, have invented certain Improvements in Attachments for Truss-Brace for Wagons, of which the following is a specification:

My invention consists in attaching a truss-brace, running lengthwise of the axle, and secured to the thimble in such a manner as to keep the axle from springing down in the center.

Figure 1:
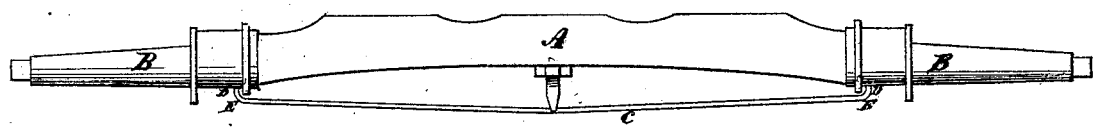
Figure 2:
Figure 3:

Figure 1 is a side view of an axle with my attachment. Fig. 2 shows a thimble with my improvement. Fig. 3 shows my mode of attaching the rod to the thimble.

A is the axle; B B, the thimbles; C, the rod or truss-brace; D, the hole in the thimble; E, the hook on the end of the rod. In the first place, my improvement is to use the common thimble, by simply drilling a hole in the under side of the thimble near the end, and making a hook on each end of the rod. This brace is easily put on by hooking one end of the rod in its place, and by heating the center of the rod it will expand enough to let the other hook drop into its place; then cool the rod and it will contract enough to tighten the skein; thus making a truss of equal strength with less than one fourth the expense, and allows the use of all common thimbles; and being simple any one can put them on; and not being expensive, can be used by one and all.

What I claim as my invention is—

The hooks on the ends of the truss-brace, together with the holes in the under side of the thimble or skein, substantially as and for the purpose set forth.

OLIVER VANORMAN.

Witnesses:
J. W. BASS,
P. H. CASE.

(31)